United States Patent
Da Silva et al.

(10) Patent No.: US 11,991,550 B2
(45) Date of Patent: *May 21, 2024

(54) MEASUREMENT CONFIGURATION OF USER EQUIPMENT

(71) Applicant: TELEFONAKTIEBOLAGET LM ERICSSON (PUBL), Stockholm (SE)

(72) Inventors: Icaro L. J. Da Silva, Solna (SE);
Muhammad Kazmi, Sundbyberg (SE);
Helka-Liina Määttanen, Helsinki (FI);
Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

This patent is subject to a terminal disclaimer.

(21) Appl. No.: 17/698,170

(22) Filed: Mar. 18, 2022

(65) Prior Publication Data
US 2022/0210684 A1    Jun. 30, 2022

Related U.S. Application Data

(63) Continuation of application No. 16/638,462, filed as application No. PCT/IB2018/056055 on Aug. 10, 2018, now Pat. No. 11,304,082.
(Continued)

(51) Int. Cl.
*H04W 24/10* (2009.01)
*H04J 11/00* (2006.01)
(Continued)

(52) U.S. Cl.
CPC ......... *H04W 24/10* (2013.01); *H04J 11/0069* (2013.01); *H04L 5/0051* (2013.01);
(Continued)

(58) Field of Classification Search
CPC . H04W 24/10; H04W 48/10; H04W 72/0453; H04W 76/27; H04W 72/046;
(Continued)

(56) References Cited

U.S. PATENT DOCUMENTS

2010/0271965 A1   10/2010   Siomina
2013/0196603 A1   8/2013   Gheorghiu
2017/0208592 A1*  7/2017   Rico Alvarino ...... H04L 5/0044

FOREIGN PATENT DOCUMENTS

CN   104081810 A   10/2013
CN   104904256 A   9/2015
(Continued)

OTHER PUBLICATIONS

Ericsson, "Multiple SS Blocks per carrier", 3GPP TSG RAN WG1 #90, R1-1712954, Prague, Czech Republic, Aug. 21-25, 2017.
(Continued)

*Primary Examiner* — Thai Nguyen
(74) *Attorney, Agent, or Firm* — Ericsson Inc.

(57) ABSTRACT

Systems, methods, and apparatus for performing measurement configuration using a user equipment, UE, and a network node are disclosed. An example method performed by a UE includes receiving a measurement configuration from a network node, where the measurement configuration specifies a reference frequency corresponding to a set of one or more carriers. The measurement configuration further specifies an offset from the reference frequency. The UE performs measurements on a reference signal located at the offset from the reference frequency and uses the measurements for one or more radio operations.

24 Claims, 15 Drawing Sheets

Related U.S. Application Data

(60) Provisional application No. 62/544,634, filed on Aug. 11, 2017, provisional application No. 62/544,618, filed on Aug. 11, 2017.

(51) Int. Cl.
  *H04L 5/00* (2006.01)
  *H04W 48/10* (2009.01)
  *H04W 72/0453* (2023.01)
  *H04W 76/27* (2018.01)

(52) U.S. Cl.
  CPC ....... *H04W 48/10* (2013.01); *H04W 72/0453* (2013.01); *H04W 76/27* (2018.02)

(58) Field of Classification Search
  CPC ............ H04W 72/0446; H04J 11/0069; H04L 5/0051; H04L 5/0048
  See application file for complete search history.

(56) References Cited

FOREIGN PATENT DOCUMENTS

| CN | 106465173 A | 2/2017 |
|---|---|---|
| JP | 201648934 A | 4/2016 |
| KR | 1020140130681 A | 11/2014 |
| WO | 2017039373 A1 | 3/2017 |

OTHER PUBLICATIONS

NTT Docomo, Inc., Frequency domain resources for NR measurements, R2-1700384, 3GPP TSG-RAN WG2 NR Ad hoc, Spokane, USA, Jan. 17-19, 2017.

MediaTek Inc. (Email discussion rapporteur), Report of email discussion [98#33][NR/Measurement configuration], R2-1706570, 3GPP TSG-RAN WG2 NR#2, Qingdao, China, Jun. 27-29, 2017.

ITL, Multiple SS block indication in wideband CC, R1-1711352, 3GPP TSG RAN WG1 NR, Qingdao, P.R. China, Jun. 27-30, 2017.

NEC, PRB and RBG indexing for Nr, R1-1710249, 3GPP TSG RAN WG1 NR Ad-Hoc#2, Jun. 27-30, 2017.

NTT Docomo, Views on CSI Framework, R1-1711077, 3GPP TSG RAN WG1 Ad-Hoc#2, Qingdao, P.R. China Jun. 27-30, Jun. 2017.

Nokia, et al., DL Signals for Mobility Measurements in NR, R1-1610292, 3GPP TSG-RAN WG1#86bis, Lisbon, Portugal, Oct. 10-14, 2016.

ZTE, Measurement configuration in NR, R2-1706665, 3GPP TSG RAN WG2#NR_AdHoc#2, Qingdao, China Jun. 27-29, 2017.

* cited by examiner

MEASUREMENT CONFIGURATION OF USER EQUIPMENT

RELATED APPLICATIONS

This application is a continuation of U.S. application Ser. No. 16/638,462, filed Feb. 11, 2020, which is a 371 of PCT/IB2018/056055, filed Aug. 10, 2018, which claims the benefit of U.S. Provisional Application No. 62/544,618 filed Aug. 11, 2017, and claims the benefit of U.S. Provisional Application No. 62/544,634 filed Aug. 11, 2017, the disclosures of which are hereby incorporated herein in their entirety by reference.

TECHNICAL AREA

The present disclosure relates, in general, to wireless communication systems such as cellular networks, and more particularly, to methods, user equipment, and network nodes for performing measurement configuration.

BACKGROUND

LTE and NR Aspects Related to Physical Layer Transmissions

In Long-Term Evolution (LTE), the user equipment (UE) performs radio resource management (RRM) measurements primarily based on primary synchronization sequence (PSS) and/or secondary synchronization sequence (SSS) and cell-specific reference signal (CRS). PSS and SSS transmissions are examples (among others) of physical layer transmissions. The UE can autonomously find LTE cells based on PSS/SSS and performs measurements on CRS for neighbor cells by simply being configured with a measurement object, whose most basic property is the carrier frequency information (e.g., 3GPP air interface E-UTRA ARFCN). That is possible because in the LTE design (1) the PSS/SSS can be blindly decoded (e.g., the limited number of sequences allow the UE to decode a physical cell identifier (PCI) without any prior sequence information); and (2) the location and bandwidths of PSS/SSS and CRS are known. That is, the PSS and SSS are always transmitted in the center of the carrier frequency on which the UE is configured to perform measurements. The CRS spans the whole transmission bandwidth and is dense enough such that it is enough to measure CRE (cell range extension) from the central six PRBs (physical resource blocks).

In NR (also referred to as 5G), the physical cell identity (PCI) is encoded in the so-called NR Synchronization Sequence (NR-SS) Block, which also includes an NR-PSS/ NR-SSS from which the UE is capable of deriving the NR PCI without prior information about the sequences provided by the network. Hence, the property 1 from LTE that is described above may also exist in the NR design. The RRM measurement in NR is based on NR-PSS/NR-SSS and may further involve physical broadcast channel demodulation reference signals (PBCH-DMRS) (e.g., if the measurement is beam specific or beam-specific measurement report is needed).

On the other hand, unlike in LTE, in NR the SS Blocks can be transmitted in different and multiple in frequency locations (e.g., not only in the center of the carrier frequency). In more detail, in the RAN1 #87 meeting it was agreed that (1) for an NR cell, the center frequency for the synchronization signal can be different from the center frequency of the NR carrier; and (2) there may be a relationship between the center frequency of the NR carrier and the center frequency of synchronization signals and there may be a tradeoff between UE complexity and flexibility.

And, in RAN1 NR Ad Hoc #1, it was agreed that (1) when the synchronization signal bandwidth is smaller than the minimum system bandwidth for a given frequency band, RAN1 strives to make the synchronization signal frequency raster sparser compared to channel raster to reduce the UE initial cell selection burden without limiting the NR deployment flexibility; and (2) when the synchronization signal bandwidth is the same as the minimum system bandwidth for a given frequency band that the UE searches, the synchronization signal frequency raster is made the same as the channel raster. In either scenario, the UE searches for all the possible synchronization signal frequency locations defined by the synchronization signal frequency raster.

One of the reasons for having this flexibility is to enable the UE to perform measurements on multiple frequencies different from the serving frequency without performing retuning (e.g., in the case of overlapping carriers).

Measurement Framework in NR

The measurement framework in NR is likely to have some similarities with the one from LTE. For example, in NR, there are concepts such as measurement objects, report configurations, quantity configuration, etc. The network can configure an RRC_CONNECTED UE to perform cell level and beam level measurements and report them in accordance with the measurement configuration. The measurement configuration is provided by dedicated signaling and includes the following parameters:

1. Measurement objects: A list of objects on which the UE shall perform the measurements. For NR the measurement object can be associated to an NR downlink carrier frequency. Associated with this carrier frequency, the network can configure a list of blacklisted' cells and a list of 'whitelisted' cells. Blacklisted cells are not applicable in event evaluation or measurement reporting. Whitelisted cells are the only ones applicable in event evaluation and/or measurement reporting. NR measurements may also be configured as inter-radio access technology (RAT) measurements on NR carrier frequency when the UE is served on LTE carrier frequency. In some instances, parameters associated to the carrier frequency that are part of the NR measurement object such as the frequency location(s) of NR-PSS/NR-SSS (not necessarily at the center). Also, in certain instances, the network may configure a list of cell-specific offsets per measurement object and the whitelisted cells may be moved to some other part of the measurement configuration. For inter-RAT E-UTRA measurements when a UE is served on NR carrier a measurement object is a single E-UTRA downlink carrier frequency.

2. Reporting configurations: A list of reporting configurations where there can be one or multiple reporting configurations per measurement object. Each reporting configuration consists of a reporting criterion, reference signal (RS) type, and reporting format. The reporting criterion is the criterion that triggers the UE to send a measurement report which can either be event triggered or periodical. The RS type indicates the RS to be considered by the UE for cell level and beam level measurements. Example RS types include the NR-SS Block or channel state information reference signal (CSI-RS). In the case of NR-SS Block, the UE can use NR-SSS and/or NR-PSS and/or NR-DMRS of PBCH to perform measurements. The reporting format indicates the cell level and beam level quantities that the UE includes in the measurement report (reference signal received power (RSRP) and/or reference signal received quality (RSRQ) and/or signal to interference plus noise ratio (SINR), or equivalent power or channel quality value) and associated information (e.g. number of cells and/or beams to report).

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: One quantity configuration is configured per RAT type. The quantity configuration defines the measurement quantities and associated filtering used for all event evaluation and related reporting of that measurement type. Four types of filters may be configured (SS-based cell level, CSI-RS-based cell level, SS-based beam level, CSI-RS-based beam level) or whether there will be some common configuration(s) e.g. same for the same RS type.

5. Measurement gaps: Periods that the UE may use to perform measurements. These include periods when there are no uplink (UL) or downlink (DL) transmissions scheduled or performed by the UE. There may be implications of NR-PSS/NR-SSS possibly being transmitted in non-fixed frequency locations (e.g., not only at the center of the carrier).

Features of Existing Solutions

In LTE, the network can configure the UE to perform (1) intra-frequency measurements (measurements at the downlink carrier frequency(ies) of the serving cell(s)); (2) inter-frequency measurements (measurements at frequencies that differ from any of the downlink carrier frequency(ies) of the serving cell(s)); and/or (3) inter-RAT measurements of E-UTRA frequencies. In LTE, to perform inter-frequency/inter-RAT measurements, the UE typically needs measurement gaps, while for intra-frequency operation measurement gaps are generally not needed, except for bandwidth (BW) limited UEs (e.g., when UE BW is less than the serving cell BW). A measurement gap pattern comprises a measurement gap length which is typically 6 milliseconds (ms) long and the measurement gap periodicity, which can be 40 ms or 80 ms. The measurement gaps are configured at the UE by the network node. During a measurement gap, the UE is not able to transmit or receive on a serving carrier and receives signals on an inter-frequency carrier frequency instead (one inter-frequency at a time in case there are multiple inter-frequencies). In NR, the UE BW is even more likely to be smaller than the cell BW or any kind of BW associate with the system and/or node and/or base station.

SUMMARY

The examples disclosed in the present disclosure provide measurement configuration techniques that allow UE to distinguish cells that are associated with different carriers and, consequently, when performing measurement reports, allow the network to decide between intra-frequency and inter-frequency handovers. Other advantages may be readily apparent to one having skill in the art. Certain embodiments may have none, some, or all of the recited advantages.

An example method performed by a user equipment includes receiving, from a network node, a measurement configuration that specifies a reference frequency corresponding to a set of one or more carriers and an offset from the reference frequency. The user equipment performs measurements on a reference signal located at the offset from the reference frequency, and uses the measurements for one or more radio operations.

An example user equipment includes processing circuitry configured to perform operations to receive, from a network node, a measurement configuration that specifies a reference frequency corresponding to a set of one or more carriers and an offset from the reference frequency. The processing circuitry is further configured to perform measurements on a reference signal located at the offset from the reference frequency and use the measurements for one or more radio operations.

An example method performed by a network node includes specifying, in a measurement configuration, a reference frequency corresponding to a set of one or more carriers and an offset from the reference frequency. The network node provides the measurement configuration to a user equipment.

An example network node includes processing circuitry configured to perform operations to specify, in a measurement configuration, a reference frequency corresponding to a set of one or more carriers and an offset from the reference frequency. The processing circuitry is further configured to provide the measurement configuration to a user equipment.

In yet other examples, a system including the user equipment and/or network node are provided that perform the above methods. Further, the present disclosure also provides a non-transitory computer-readable medium comprising computer instructions stored thereon that, when executed by a processing circuit, cause the processing circuit to perform the above methods.

BRIEF DESCRIPTION OF THE DRAWINGS

For a more complete understanding of the disclosed embodiments and their features and advantages, reference is now made to the following description, taken in conjunction with the accompanying drawings.

DETAILED DESCRIPTION

Figure 1:
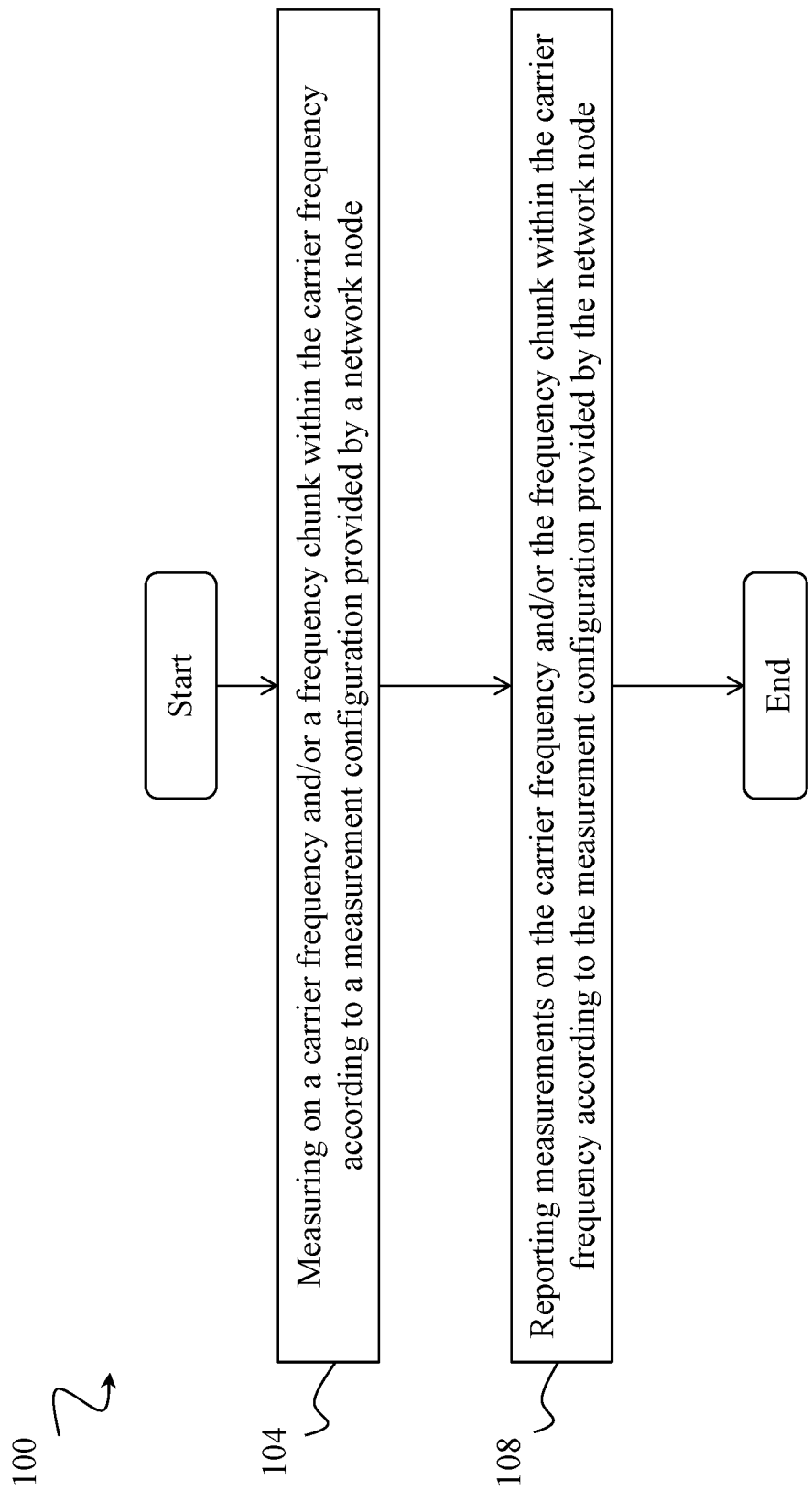
FIG. 1 illustrates a method of performing measurements, according to some examples.

This disclosure contemplates solutions to conventional radio network technology problems, including that when SS Blocks are transmitted in the same or different frequency locations for different overlapping carriers, if the NR-absolute radio frequency channel number (ARFCN) does not define a non-overlapping spectrum for one carrier then the UE will not be able to use the NR-ARFCN value to detect the measurement object to which the found NR cell belongs. As a result, the UE cannot distinguish cells for the different carriers and, if the LTE framework for RRM measurement configuration is followed, measurements events cannot be properly configured by the network or reported by the UE. Accordingly, inter-frequency mobility in the network will be limited.

In more detail regarding limitations on inter-frequency mobility in LTE, if the network intends to configure the UE to perform measurements to support inter-frequency mobility, different measurements objects can be configured, one per carrier frequency and a cell found in the center of the configured carrier is measured and evaluated for event triggering criteria per carrier. Hence, the network could set an event where any cell in the serving frequency becomes worse than an absolute measurement threshold and any cell of a given neighbor frequency becomes better than an absolute threshold, which is an indication of a potential inter-frequency handover. However, in this scenario, if the LTE framework is applied (e.g. a measId associates a reportConfig and a measObject), problems can occur. The network could configure an event to identify that inter-frequency becomes better than a given threshold and, as UE cannot distinguish inter-frequency and intra-frequency cells, the UE has no means to know which measurement ID that measurements should be associated with because the UE cannot know which measurement objects these cells are associated with (e.g., a measId associates a reportConfig and a measObject). All cells fulfilling the triggering conditions could be included in the cell Triggered list, reported, and the UE could arbitrarily select a measId (e.g., a measObject). But then, the network would have no means to known which cells are inter-frequency or intra-frequency.

Other problems with conventional technology include that if non-overlapping NR-ARFCN bandwidths are used, SS Blocks would be transmitted in different frequency locations for the same carrier in different nodes. As a result, the UE would not be able to detect all detectable cells by measuring one or a portion of the possible NR-SS locations. In more detail regarding this scenario, if the LTE measurement framework is followed, the network may have difficulty performing intra-frequency mobility. In LTE, if the network intends to configure the UE to perform measurements to support intra-frequency mobility, the measurement object associated with the serving frequency can be configured, and, a cell found in the center of the configured carrier is measured and evaluated for event triggering criteria per carrier. If the UE finds an intra-frequency cell fulfilling the event conditions (e.g. neighbor cell becomes better than the serving cell by a threshold), the UE may trigger a measurement report, include the cell measurements and associate with the configured measId, which links the measurement object and the reportConfig, which contains the eventId that was triggered. When receiving the report associated to the configured measId, the network knows that the reported cells are intra-frequency cells. Accordingly, if a single measurement object is configured, the UE may not find intra-frequency cells. And, if multiple measurement objects are configured, the UE might not be able to distinguish intra-frequency and inter-frequency cells i.e. the UE may find a cell in the same carrier but in a different frequency location and not be able to identify that this is an intra-frequency cell.

While conventional technology generally is sufficient for supporting communications, techniques are needed to address problems such as those identified above. In that regard, this disclosure contemplates defining a set of one or multiple frequency chunks (FC) per carrier frequency where reference signal(s) (RS) can be transmitted by the network node and detected and/or measured by a UE. The UE finds RSs for different carriers within the same FC and, possibly performing these inter-frequency measurements without the need to frequency re-tuning (e.g., a FC is within a UE's minimum bandwidth). The UE may be configured with a FC for measurements or search through pre-defined or known FCs, and there may be a FC for intra-frequency measurement, an FC for inter-frequency measurements, and so forth. The UE may report FC where measurements were performed. This disclosure also contemplates defining for each FC, multiple frequency resource blocks (FRB). Each FRB within a FC may be associated with a given carrier frequency. The given carrier frequencies are provided to the UE so that the UE can distinguish RSs from different carrier frequencies even if the reference signal for RRM measurements are transmitted in the same FC.

In a specific frequency chunk (FC) and frequency resource block (FRB), the UE can search for a reference signal, which can be a synchronization signal (SS) used to perform one or more radio operations. Examples of radio operations are cell detection, time and/or frequency synchronization aka time and/or frequency synchronization tracking, RRM measurements, positioning, radio link monitoring, etc. In some examples, the reference signal can be (1) an NR-SS (NR-PSS/NR-SSS) encoding the physical cell identifier in NR; (2) a demodulation reference signal (DMRS) which may be further associated with a specific channel e.g. PBCH DMRS or data DMRS; and/or (3) a CSI-RS that could either implicitly or explicitly encode a beam identifier. While some examples below describe the NR-SS as the RS, the RS can also be one of the other RSs shown above or, there can be multiple RS configurations with the FC and FRB configured per RS.

According to an example embodiment, a method in a radio access network (RAN) and/or a method in a UE includes the UE performing measurements on a specific carrier frequency and/or a specific frequency chunk within that specific carrier frequency according to a measurement configuration provided to the UE by the network node. The chunk configuration may be signaled by the network node or may be pre-defined or derived/determined by the UE. The chunk configuration may further depend on UE capability, e.g., chunk size or the number of chunks or the set or the number of carriers associated with a chunk, etc.

According to another example embodiment, a method in a radio access network (RAN) and/or a method in a UE includes the UE performing measurement reporting for measurements on a specific carrier frequency and a specific frequency chunk within that specific carrier frequency according to a measurement configuration provided to the UE by the network node.

In various embodiments described herein, a UE can be any type of wireless device capable of communicating with a network node or another UE over radio signals. The UE may also be a radio communication device, target device, device to device (D2D) UE, machine type UE, or UE capable of machine to machine communication (M2M), a sensor equipped with UE, tablet, mobile terminals, smart phone, laptop embedded equipped (LEE), laptop mounted equipment (LME), USB dongles, Customer Premises Equipment (CPE), etc.

In various embodiments described herein, a network node includes any kind of network node which may comprise of a radio network node such as base station (BS), radio base station, base transceiver station, base station controller, network controller, multi-standard radio BS, gNB (5G base station), NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise test equipment. The term "radio node" used herein may be used to denote a UE or a radio network node.

In various embodiments described herein, signaling includes high-layer signaling (e.g., via RRC or a like), lower-layer signaling (e.g., via a physical control channel or a broadcast channel), or any combination thereof. The signaling may be implicit or explicit. The signaling may further be unicast, multicast, or broadcast. The signaling may also be directly to another node or via a third node.

In various embodiments described herein, radio measurement includes measurement performed on radio signals. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., RTT, Rx-Tx, etc.). Some examples of radio measurements: timing measurements (e.g., TOA, timing advance, RTT, RSTD, Rx-Tx, propagation delay, etc.), angle measurements (e.g., angle of arrival), power-based measurements (e.g., received signal power, RSRP, received signal quality, RSRQ, SINR, SNR, interference power, total interference plus noise, RSSI, noise power, etc.), cell detection or cell identification, positioning, radio link monitoring (RLM), system information (SI) reading, etc.

Performing a measurement on a carrier may imply performing measurements on signals of one or more cells operating on that carrier or performing measurements on signals of the carrier (e.g. carrier specific measurement such as RSSI). Examples of cell specific or beam specific measurements are signal strength, signal quality, etc.

In various embodiments described herein, measurement performance includes any criteria or metric which characterizes the performance of the measurement performed by a radio node. The term measurement performance may also be called a measurement requirement, measurement performance requirements, and so forth. The radio node has to meet one or more measurement performance criteria related to the performed measurement. Examples of measurement performance criteria are measurement time, number of cells to be measured with the measurement time, measurement reporting delay, measurement accuracy, measurement accuracy with respect to a reference value (e.g. ideal measurement result), etc. Examples of measurement time are measurement period, cell detection or cell identification period, evaluation period, beam detection or beam identification period, and so forth.

In various embodiments described herein, numerology includes any one or a combination of: subcarrier spacing, number of subcarriers within a bandwidth, resource block size, symbol length, CP length, and so forth. In one specific non-limiting example, numerology comprises subcarrier spacing of 7.5 kHz, 15 kHz, 30 kHz, 60 kHz, 120 kHz, or 240 kHz. In another example, numerology is the CP length which may be used with subcarrier spacing 30 kHz or larger.

In various embodiments described herein, bandwidth (BW) includes a range of frequencies over which a node transmits to and/or receives signal from another node. The BW may also be called an operating bandwidth, channel bandwidth, system bandwidth, configured bandwidth, transmission bandwidth, cell bandwidth, cell transmission BW, carrier bandwidth, and so forth. The BW can be expressed in any one of the following: G1 MHz, G2 GHz, in in terms of number of physical channels (e.g. G3 resource blocks, G4 subcarriers etc). In one example the BW can include guard band while in another example, the BW can exclude guard band. For example, system or channel BW can include guard band while transmission bandwidth consists of BW without guard band. For simplicity term BW is used in the embodiments.

In various embodiments described herein, a frequency resource block (FRB) includes any type of frequency resource comprising one or more resource elements or subcarriers. The FRB may also be referred to as a resource block (RB), physical RB (PRB), virtual RB (VRB), and so forth.

The embodiments described herein are applicable to any multicarrier system wherein at least two radio network nodes can configure radio measurements for the same UE. One specific example scenario comprises a dual connectivity deployment with LTE PCell and NR PSCell. Another example scenario is a dual connectivity deployment with NR PCell and NR PSCell.

Figure 10:
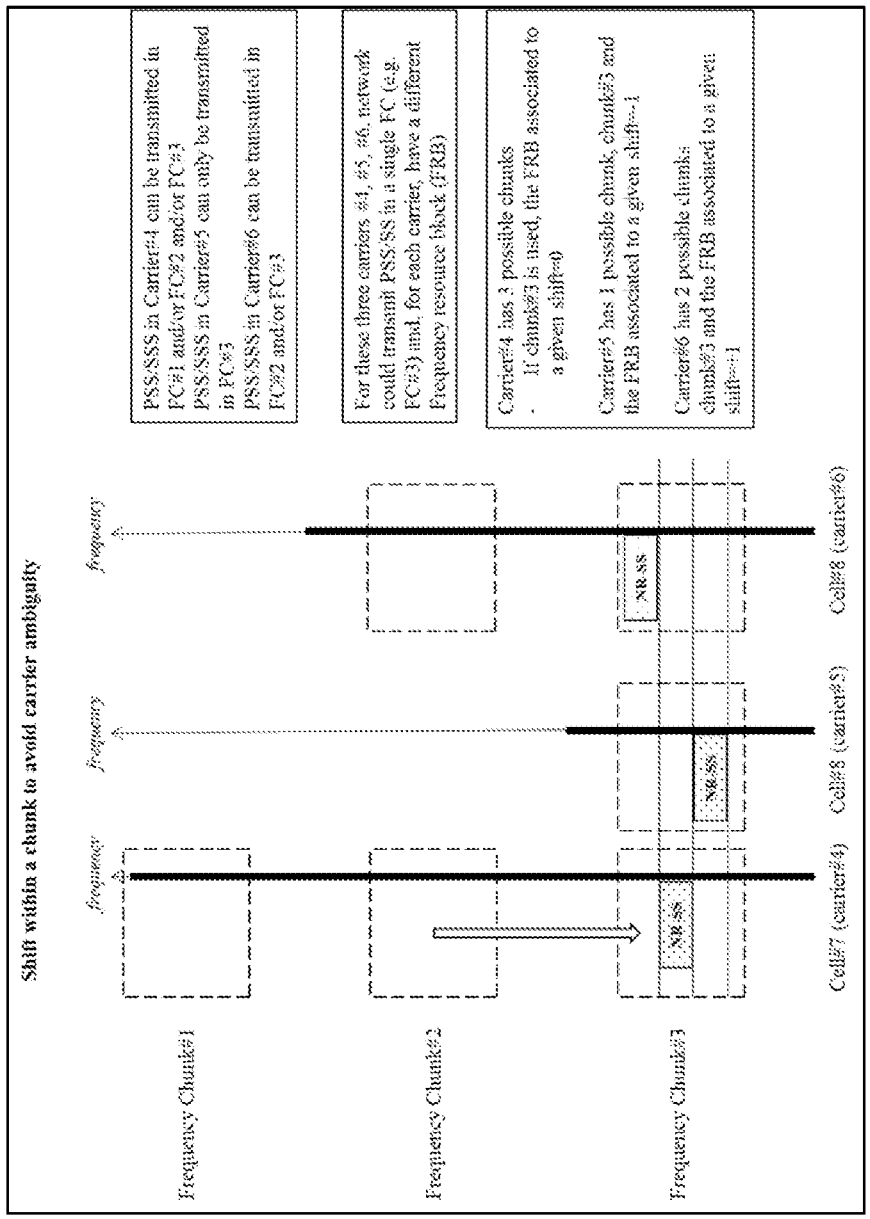
FIG. 10 is a block schematic of an exemplary shift corresponding to frequency resource blocks of different carriers, according to some examples.

In more detail, an example technique for avoiding the carrier ambiguity problems discussed above includes shifting NR-SS Blocks within a frequency chunk to distinguish between the carriers. As shown in FIG. 10, an example configuration may specify that an NR-SS Block (which may include an encoded PSS/SSS) in Carrier #4 can be transmitted in FC #1, FC #2, and/or FC #3; an NR-SS Block in carrier #5 can be transmitted in FC #3; and an NR-SS block in carrier #6 can be transmitted in FC #2 and/or FC #3.

Because a network node may transmit an NR-SS for these three carriers in a single FC (e.g., FC #3), a different FRB provided for each carrier at a different shift value. In more detail, in FIG. 10, carrier #4 has three possible FCs available for use by the carriers. If FC #3 is used, a shift associated with its FRB is set to zero. Carrier #5 has one possible FC, FC #3, and the shift associated with its FRB is set to negative one. Carrier #6 has two possible FCs, FC #2 and FC #3, and the shift associated with its FRB is positive one. Accordingly, by associating a shift with an FRB for each carrier, the NR-SS Block for each carrier is at a different position within an FC, with the result being that carrier ambiguity is avoided. As another example, an FC can be of a size of 24 RBs or SS block size, indicating zero shift.

Figure 11:
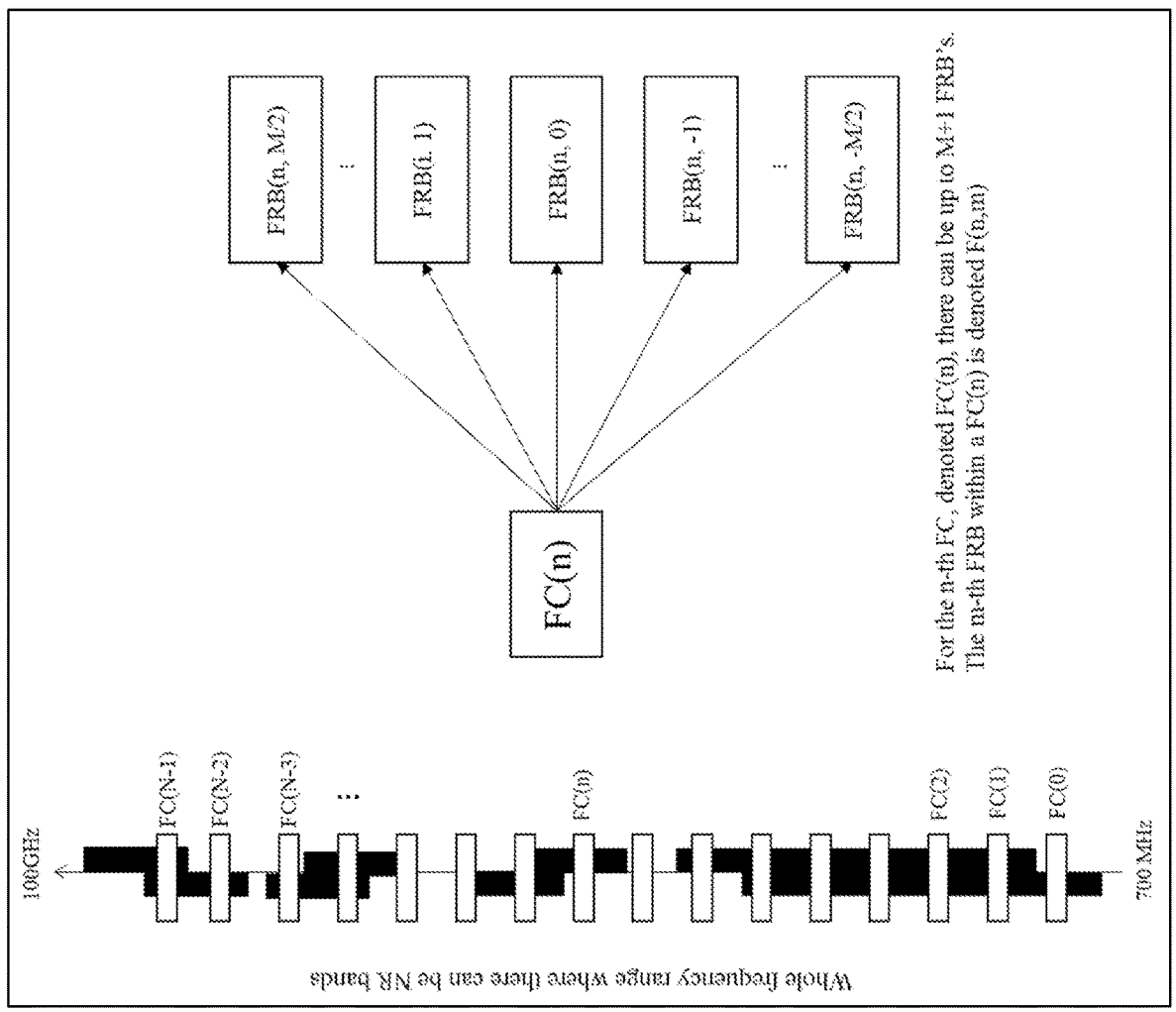
FIG. 11 is a block schematic of a frequency chunk and frequency resource block configuration, according to some examples.

FIG. 11 provides another example regarding FC and FRB configuration. As shown in FIG. 11, there is a frequency range where there can be NR bands that include FCs. The FCs can be provided with a number of FRBs. Each FC can be denoted as FC(n), where n indicates the particular FC. Similarly, the m-th FRB within FC(n) can be denoted as F(n,m).

The below techniques provide example techniques for the network to configure the UE. This configuration can be implicit, explicit or a combination of explicit/implicit. Example configurations include:

A. Explicit FC and Explicit FRB: the network node configures one FC parameter, which can be an integer indicating the FC, or bitmap indicating more than one locations, within the carrier frequency where the UE should search for the RS, and another FRB where there can be another integer indicating the FRB, or bitmap indicating more than one locations, within the carrier frequency and within the FC where the UE should search for the RS.

B. Explicit FC and Implicit FRB (given by the carrier frequency): the network configures the FC parameter, which can be an integer indicating the FC where the UE should search for the RS, and, by also knowing the carrier frequency (which can be part of the configuration), and the FC, the UE derives the exact FRB. In other words, there is a fixed mapping in the standard (i.e. UE is aware of that mapping) between a carrier frequency and the FRB that a specific RS can be transmitted for a given FC (that can be provided by the network). In that case, there can be one FRB per carrier frequency that has other overlapping FCs. Hence, if a new carrier with an overlapping FC is defined in the system, new FRBs per chunk may need to be added and the FC may expand upwards or downwards.

C. Implicit FC and Implicit FRB (both given by the carrier frequency): the network configures the UE with a carrier frequency. Then, the standard defines a default FC per carrier frequency so the UE knows the exact FC to search for the RS based only on the information about the carrier frequency to be measured. Based on the configured carrier frequency, the UE derives the FRB within the FC where the UE should search the RS. The default FC can be the one closest to the center of the carrier.

D. Implicit FC and Implicit FRB (blind search): the network configures the UE with a carrier frequency. The standard defines a full flexibility in terms of FC and FRB per FC usage per carrier frequency. Then, if nothing is provided to the UE except the carrier frequency, the UE can perform a blind search for all possible FCs, defined in the standard and finite for a given carrier frequency, and, within an FC, a FRB to detect the RS. There can be variants of this method where one parameter is provided while the other is found blindly. For example, the network may provide the UE with the chunk and the UE, by knowing all possible FRBs per FC defined in the standard, can blindly detect which FRB is being used to transmit the RS.

E. Implicit FC (default) and Explicit FRB (given by the carrier frequency): the network configures the UE with a carrier frequency. Then, the standard defines a default FC per carrier frequency so the UE knows the exact FC to search for the RS based only on the information about the carrier frequency to be measured. In addition, the network can configure the FRB where the UE should search the RS for a given FC.

F. Implicit FC (default) and Implicit FRB (default): the network configures the UE with a carrier frequency. Then, the standard defines a default FC per carrier frequency so the UE knows the exact FC to search for the RS based only on the information about the carrier frequency to be measured. In addition, the network can configure the FRB where the UE should search for the RS for a given FC.

G. Another example of Explicit FC and Explicit FRB: the network node configures a frequency offset (Fos) parameter with respect to a reference frequency value (Fref). Examples of reference frequency are center frequency of a reference cell (e.g. serving cell), center frequency of SSB of a reference cell, starting frequency (e.g. ARFCN) of a frequency band, last frequency in the frequency band, etc. The frequency offset (Fos) is used by the UE to determine the location of the FC in the frequency domain. For example, the Fos and Fref can be used by the UE to determine one of: a center frequency of FC, starting frequency of FC, and end frequency of FC. The length or size of the FC in frequency domain can be pre-defined or can be configured by the network node. The network node further transmits information about frequency location of SSB within FC (e.g. an offset (Sos) with respect to a reference frequency resource (Sref) within FC). For example, Sos may be defined with respect to the center of the FC. The Sos and Sref are then used by the UE to determine the location of the SSB within the FC. The UE searches the cell using the RS transmitted within the SSB.

H. Pre-defined identifiers of FC: In another example, identifiers of FCs can be pre-defined within a certain frequency range (e.g. between 1-3 GHz, 3-6 GHz, etc) and/or within each frequency bands. In this example, the network node configures the UE with one or more pre-defined identifiers of FC and also the frequency band(s) or frequency range(s) of the configured FC. This enables the UE to determine the exact frequency or frequency range of the configured FC. The information about the location of each SSB for each carrier within the FC can be signaled to the UE (e.g., offsets with respect to the center frequency of the FC).

Where the information about the FC is provided: the configuration (implicit and/or explicit) of the FCs and FRBs can be included in the system information or in one of the following parts of the measurement configuration:

A. FC is Part of the Measurement Object (MO)

In the case of explicit FC configuration, the FC can be provided together with the carrier frequency information (e.g. ARFCN-ValueNR in the case of NR or ARFCN-ValueEUTRA in the case of E-UTRA/LTE). The FC information can be provided as an integer known by the UE to be mapped to a given frequency resource set where the UE should search for a particular RS. For a given carrier frequency that is configured in the MO there can be multiple possible FCs defined in the standard, hence, by providing the FC within the MO together with the carrier frequency, the UE can directly search for the RS in the correct FC.

In the case of implicit FC configuration, there can be a default FC value derived from the carrier frequency information (e.g. ARFCN-ValueNR in the case of NR or ARFCN-ValueEUTRA in the case of E-UTRA/LTE). That default FC value can be related to the center of the carrier.

Figure 12A:
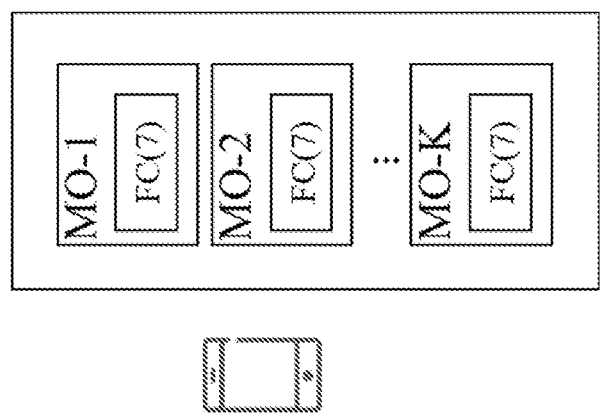
FIGS. 12A and 12B are block schematics of exemplary frequency chunk configurations as provided by measurement objects, according to some examples.

The network node can configure multiple MOs with the same FC value for the same UE (e.g., multiple carrier frequencies to be measured will have the same FC (possibly within the UE's minimum bandwidth)). In the example shown in FIG. 12A, the network has configured the UE with measurement objects MO-1, MO-2, MO-K, each associated to a different carrier frequency (e.g. carriers 1, 2, ..., K), and, as these carriers could be overlapping, the same frequency chunk is configured per MO, i.e., FC(7).

Figure 12B:
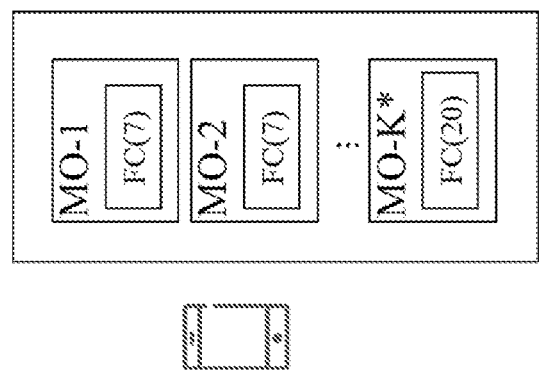

The network node can configure multiple MOs with different FC values for the same UE (e.g., multiple carrier frequencies to be measured will have different FC values (i.e. frequency re-tuning may be needed depending on UE's minimum bandwidth and distance between FCs)). In the example shown in FIG. 12B, the network has configured the UE with measurement objects MO-1, MO-2, ..., MO-K*, each associated to a different carrier frequency (e.g. carriers 1, 2, ..., K*), and, as these carriers are not all overlapping, different frequency chunks are configured (e.g., FC(7) and FC(20)).

In the case the FC is associated to a MO, for all report configuration (e.g. reportConfig containing the measurement events like A1, A2, etc.) associated to that MO, the UE will search the RS in the frequency resources associated to that FC. In other words, it is not possible to have different events for the same carrier associated to different FCs. Multiple measurement IDs associated to the same MO should be done on the same FC (which could be a limitation in the case the same carrier can transmit multiple simultaneous SS Blocks in different FCs).

The network node can configure the UE with the same MO but potentially with multiple FC values to cover the case where the UE should measure multiple simultaneous SS Blocks for the same carrier transmitted in different frequency locations. The network can also configure the UE with information. In that case, the same cell can be transmitting in different FCs for the same MO and the network can configure the UE to perform measurements based on these two RSs with same PCI.

B. FC is Part of the Measurement Object (MO)

In the case of explicit FRB configuration, the FRB can be provided together with the carrier frequency information (e.g. ARFCN-ValueNR in the case of NR or ARFCN-ValueEUTRA in the case of E-UTRA/LTE). The FRB information can be provided as an integer known by the UE to be mapped to a very specific frequency resources where the UE should search for a particular RS.

The FRB information can be provided together with the FC. Hence, for a given MO, the UE will know which chunk and which FRB to search the RS. Also, the UE knows that if it finds an RS in the indicated FRB/FC, that RS should be associated with the configured MO (and reportConfig and measId).

The FRB can have a hierarchical structure that is combined with the FC (e.g., for a given FC there can be a finite set of FRBs indicated by an integer). These two parameters could be combined in a single IE that is part of the measurement object.

C. Only FC and FRB Define a Measurement Object

The measurement object is characterized by the FC (e.g., the carrier frequency becomes a secondary information), to certain extent. In that case, the network configures the UE with the exact FC where the UE should search for the RS. Different MO's would have different FCs, although they could still be within the UE's minimum bandwidth to avoid frequency re-tuning in the case of overlapping carriers.

The measurement object is characterized by both the FC and the FRB. In that case, the network configures the UE with the exact FC where the UE should search for the RS and the exact FRB. Different MO's would have different FCs/FRBs couple, so that the same FC could be defined for different carriers but different FRBs would characterize that these are different carriers.

The fact that the MO is characterized by one of these two parameters do not preclude the usage of the carrier frequency information in the MO for implicit configurations as described above (e.g., depending on the carrier frequency the UE assumes for a given FC that the RS is transmitted in a specific FRB).

D. FC is Part of the Report Configuration

The network node can configure the FC as part of the report configuration. For example, the FC can be linked to each measurement event the network node may want to configure. As a measurement identifier (measId) links a reportConfig to a measObject, for different MOs (e.g., for different carrier frequencies) there can be the same FC, so that as long as that is within the UE's minimum bandwidth, inter-frequency measurements without re-tuning can be performed.

Another potential advantage is that the reportConfig also tells which RS to use for a given event. Hence, the FC could be directly associated to the RS to be measured, while in the case of being configured in the MO may require FC information per RS type (e.g. NR-SS and CSI-RS).

The network can link multiple report configurations to the same MO. In that case, since each reportConfig can have a FC, there can be multiple FCs associated to the same MO, which can be useful in the case of multiple simultaneous SS Block transmissions per carrier.

To allow the UE to distinguish RSs from different carriers, the FRBs should be different for different carriers, although the FC could be the same. Hence, the FC being part of the reportConfig still allows the FRB to be associated with the MO, and be possibly configured explicitly or implicitly. For example, there can be a one-to-one mapping between a set of allowed FRBs per carrier frequency. The set is given since there can be multiple FCs. Hence, for a given measId linking a MO and a reportConfig, the UE knows the FC for that measId and the MO. Thanks to the MO the UE knows the exact FRB for that provided FC. Alternatively, the UE is provided with the FRB in the MO explicitly.

If the same FRB is used for different MO's (e.g., for different carrier frequencies), the UE cannot distinguish the cells from different carriers.

Examples for Providing FC and/or FRB Information

For UEs in RRC Connected state, the information about FC and/or FRB can be provided as part of the measurement configuration (measConfig) which can be provided in an RRC Connection Reconfiguration, an RRC Connection Resume or an RRC Connection setup. The information may also be provided via system information (broadcasted or UE specific or upon a request or upon a determined need, etc.) and some common parts of the information may also be provided via broadcasted system information. For UEs in RRC Inactive state or RRC Idle, the information about FC and/or FRB can be provided via system information, which can either be broadcast or requested on demand The UE may perform measurement reporting on measurements on a specific carrier frequency and a specific frequency chunk within that specific carrier frequency according to a measurement configuration provided by the network. If the FC and/or FRB are part of the measurement object and the UE is configured to measure X carriers, the UE may be configured with X measurement objects where each of them will have their own FC/FRB. Each of them will be linked to a measId and a reportConfig. Hence, if the UE finds a cell in a given FC/FRB, the UE can associate to the correct MO and, consequently, to the correct measId. Hence, reporting the measId with cell/beam level measurements is sufficient to allow the network to identify to which carrier these measurements are associated.

In the scenario where the network configures the UE with the FC and not the FRB, and there is no 1-to-1 mapping defined in the standard between carrier frequency and FRB, the UE can blindly search for the configure FCs the cells in the possible FRBs for the FC. When the UE finds a cell and an event for that configured MO/reportConfig is triggered (e.g., for the configured frequency chunk), the UE includes in the measurement report the FRB where it has found the cells whose information is to be included in the measurement report (e.g. triggered cells).

In the scenario where the network does not configure the UE with the FC and/or FRB, both can be included together with the detected cell in the measurement report.

FIG. 1 illustrates an example method 100 of performing measurements. In particular embodiments, a UE performs method 100. The UE begins by measuring on a carrier frequency and/or a frequency chunk within the carrier frequency according to a measurement configuration provided by a network node in step 104. In step 108, the UE reports measurements on the carrier frequency and/or the frequency chunk within the carrier frequency according to the measurement configuration provided by the network node.

Figure 2:
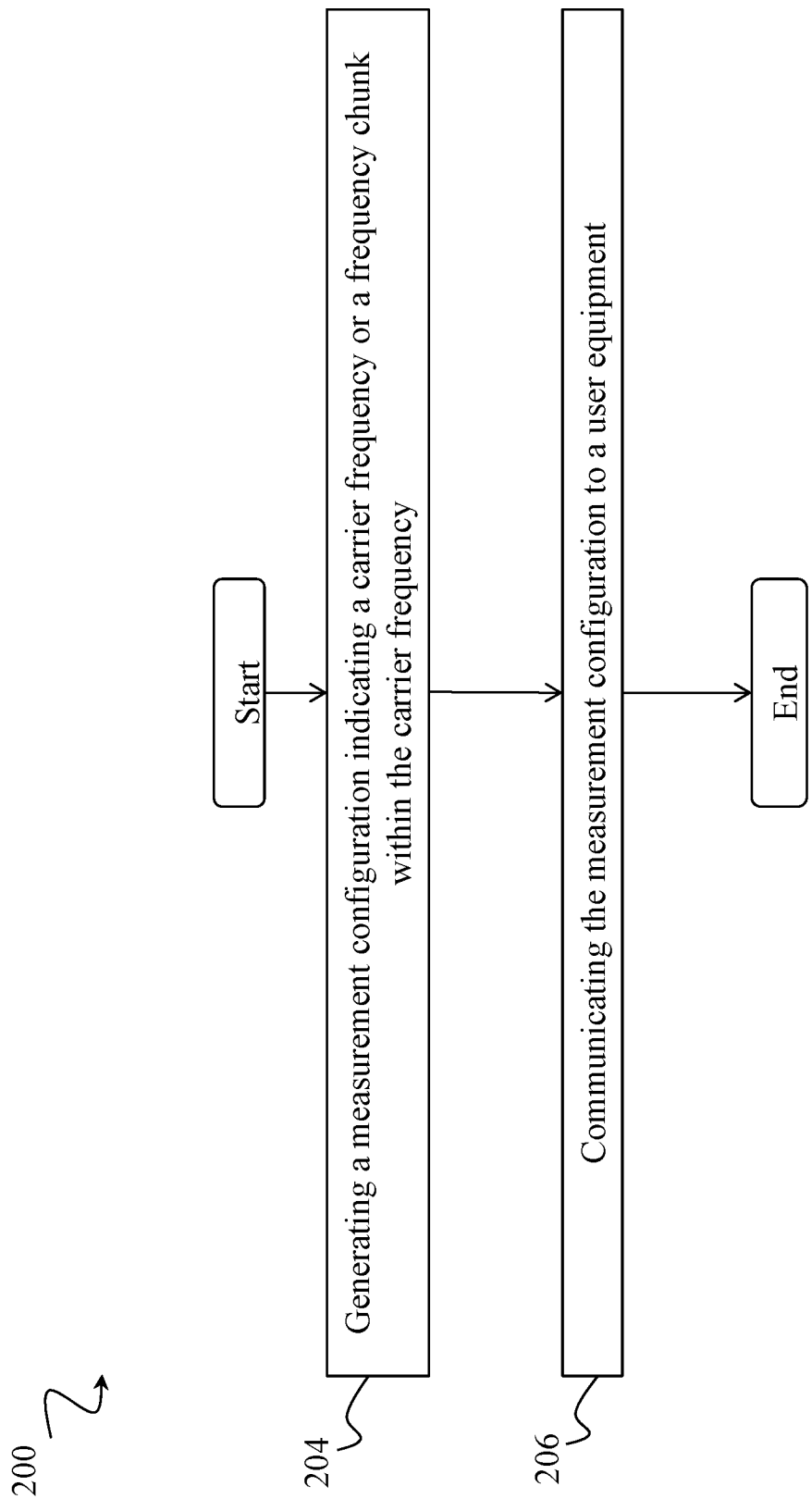
FIG. 2 illustrates a method of configuring measurements, according to some examples.

FIG. 2 illustrates an example method 200 of configuring measurements. In particular embodiments, a network node performs method 200. The network node begins by generating a measurement configuration indicating a carrier frequency and/or a frequency chunk within the carrier frequency in step 204. In step 206, the network node communicates the measurement configuration to a user equipment. The UE may perform measurements and report measurements using the communicated measurement configuration as described herein.

Figure 3:
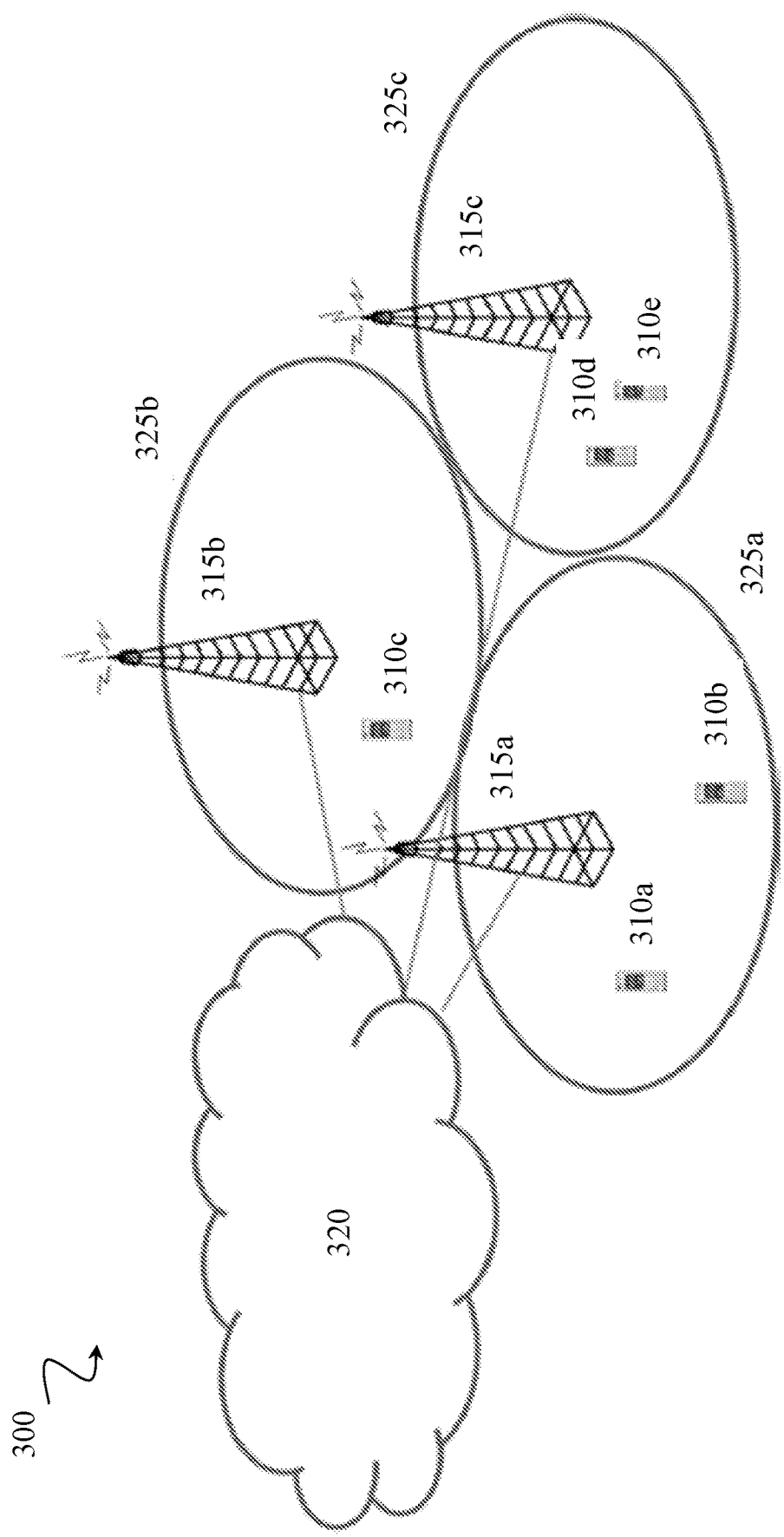
FIG. 3 is a block diagram illustrating an embodiment of a network, according to some examples.

FIG. 3 is a block diagram illustrating an embodiment of a network 300, in accordance with certain embodiments. Network 300 includes one or more UE(s) 310a, 310b, 310c, 310d, and 310e, which may be interchangeably referred to as wireless devices 310, and one or more network node(s) 315a, 315b, and 315c, which may be interchangeably referred to as eNBs 315. UEs 310 may communicate with network nodes 315 over a wireless interface. For example, a UE 310 may transmit wireless signals to one or more of network nodes 315, and/or receive wireless signals from one or more of network nodes 315. The wireless signals may contain voice traffic, data traffic, control signals, and/or any other suitable information. In some embodiments, an area of wireless signal coverage associated with a network node 315 may be referred to as a cell, examples of which are shown in the figure by cell 325a, cell 325b, and cell 325c. In some embodiments, UEs 310 may have device-to-device (D2D) capability. Thus, UEs 310 may be able to receive signals from and/or transmit signals directly to another UE.

In certain embodiments, network nodes 315 may interface with a radio network controller. The radio network controller may control network nodes 315 and may provide certain radio resource management functions, mobility management functions, and/or other suitable functions. In certain embodiments, the functions of the radio network controller may be included in network node 315. The radio network controller may interface with a core network node. In certain embodiments, the radio network controller may interface with the core network node via an interconnecting network 320. Interconnecting network 320 may refer to any interconnecting system capable of transmitting audio, video, signals, data, messages, or any combination of the preceding. Interconnecting network 320 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 310. UEs 310 may exchange certain signals with the core network node using the non-access stratum layer. In non-access stratum signaling, signals between UEs 310 and the core network node may be transparently passed through the radio access network. In certain embodiments, network nodes 315 may interface with one or more network nodes over an internode interface, such as, for example, an X2 interface.

As described above, example embodiments of network 300 may include one or more wireless devices 310, and one or more different types of network nodes capable of communicating (directly or indirectly) with wireless devices 310.

In some embodiments, the non-limiting term UE is used. UEs 310 described herein can be any type of wireless device capable of communicating with network nodes 315 or another UE over radio signals. UE 310 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 310 may operate under either normal coverage or enhanced coverage with respect to its serving cell. The enhanced coverage may be interchangeably referred to as extended coverage. UE 310 may also operate in a plurality of coverage levels (e.g., normal coverage, enhanced coverage level 3, enhanced coverage level 2, enhanced coverage level 3 and so on). In some cases, UE 310 may also operate in out-of-coverage scenarios.

Also, in some embodiments generic terminology, "radio network node" (or simply "network node") is used. It can be any kind of network node, which may comprise a base station (BS), radio base station, Node B, multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

This disclosure contemplates any of the UEs 310 and network nodes 315 in network 300 performing any of the operations and processes described above. For example, any of UEs 310 can perform measurements on a carrier frequency and/or a frequency chunk within the carrier frequency according to a measurement configuration provided by a network node, and report measurements on the carrier frequency and/or the frequency chunk within the carrier frequency according to the measurement configuration. As another example, any of network nodes 315 may generate a measurement configuration indicating a carrier frequency or a frequency chunk within the carrier frequency and communicate the measurement configuration to a user equipment.

Example embodiments of UE 310, network nodes 315, and other network nodes (such as radio network controller or core network node) are described in more detail below with respect to FIGS. 4-9.

Figure 4:
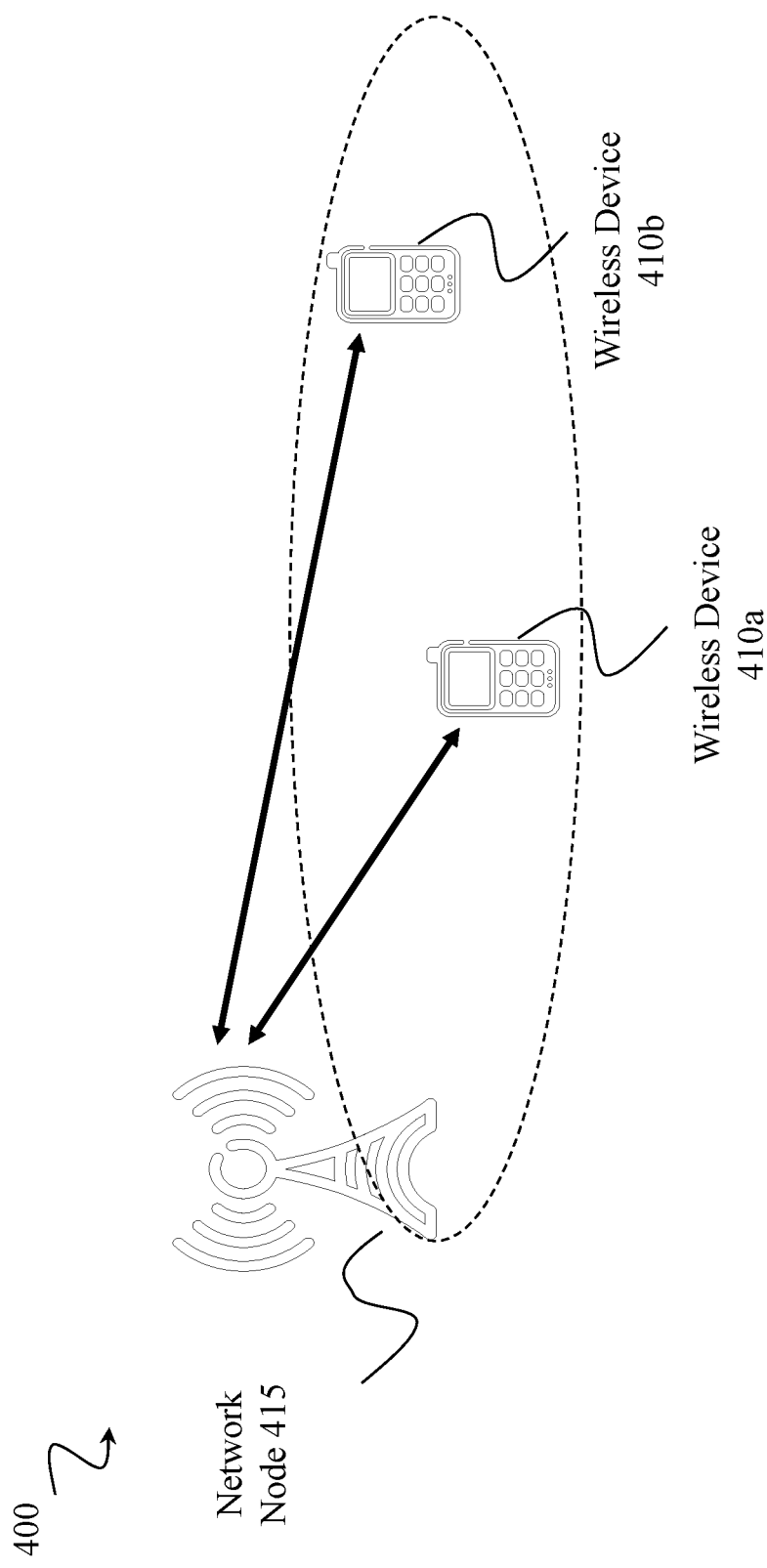
FIG. 4 is a block diagram illustrating an embodiment of a network, according to some examples.

Although FIG. 3 illustrates a particular arrangement of network 300, the present disclosure contemplates that the various embodiments described herein may be applied to a variety of networks having any suitable configuration (e.g., the embodiment illustrated in FIG. 4). FIG. 4 illustrates network 400 including one network node 415 in communication with two wireless devices 410a and 410b. This disclosure contemplates network 400 may include any number of UEs in communication with any number of network nodes. Network 400 may include any suitable number of UEs 410 and network nodes 415, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

Figure 5:
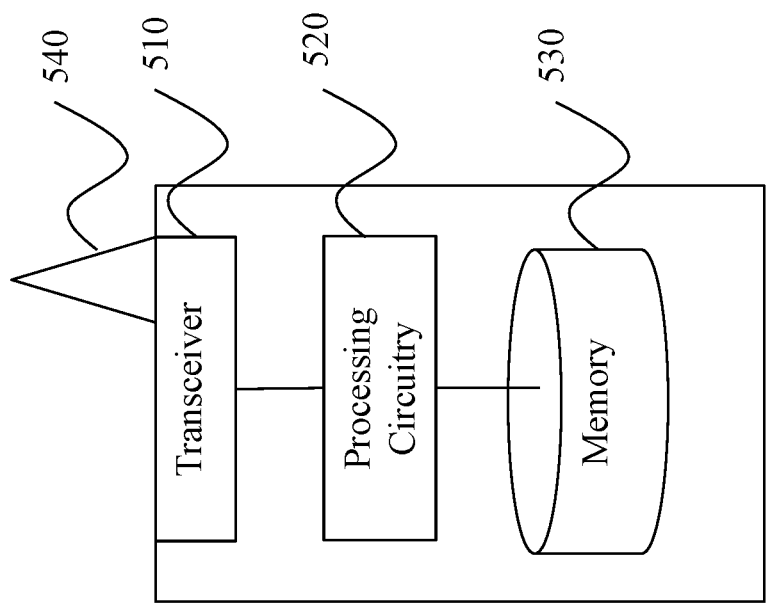
FIG. 5 is a block schematic of an exemplary wireless device, according to some examples.

FIG. 5 is a block schematic of an exemplary wireless device 510, in accordance with certain embodiments. In some embodiments, wireless device 510 provides UE, such as UE 310 that is shown in FIG. 3. Wireless device 510 may refer to any type of wireless device communicating with a node and/or with another wireless device in a cellular or mobile communication system. Examples of wireless device 510 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 510 may also be referred to as UE, a station (STA), a device, or a terminal in some embodiments. Wireless device 510 includes transceiver 510, processing circuitry 520, and memory 530. In some embodiments, transceiver 510 facilitates transmitting wireless signals to and receiving wireless signals from a network node (e.g., via an antenna), such as network node 315 that is shown in FIG. 3. Processing circuitry 520 executes instructions to provide some or all of the functionality described above as being provided by wireless device 510, and memory 530 stores the instructions executed by processing circuitry 520.

Processing circuitry 520 may include any suitable combination of hardware and software implemented in one or more modules to execute instructions and manipulate data to perform some or all of the described functions of wireless device 510, such as the functions of wireless device 510 described above in relation to FIGS. 1-4. In some embodiments, processing circuitry 520 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 530 is generally operable to store instructions, such as a computer program, software, an application including one or more of logic, rules, algorithms, code, tables, etc. and/or other instructions capable of being executed by processing circuitry 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 520.

Other embodiments of wireless device 510 may include additional components beyond those shown in FIG. 5 that may be responsible for providing certain aspects of the wireless device's functionality, including any of the functionality described above and/or any additional functionality (including any functionality necessary to support the solution described above). As just one example, wireless device 510 may include input devices and circuits, output devices, and one or more synchronization units or circuits, which may be part of the processing circuitry 520. Input devices include mechanisms for entry of data into wireless device 510. For example, input devices may include input mechanisms, such as a microphone, input elements, a display, etc. Output devices may include mechanisms for outputting data in audio, video and/or hard copy format. For example, output devices may include a speaker, a display, etc.

Figure 6:
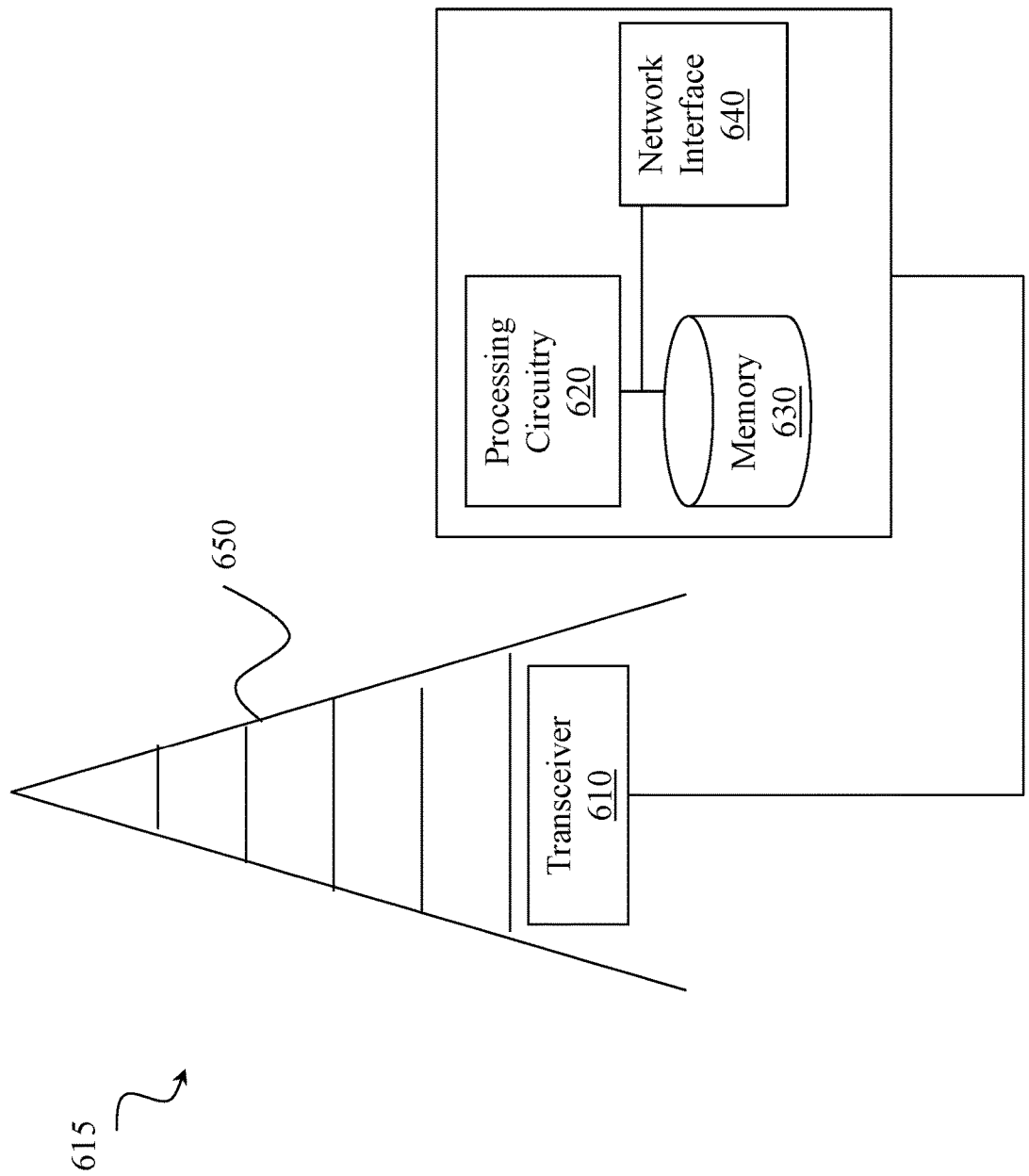
FIG. 6 is a block schematic of an exemplary network node, according to some examples.

FIG. 6 is a block schematic of an exemplary network node 615, in accordance with certain embodiments. Network node 615 may be any type of radio network node or any network node that communicates with a UE and/or with another network node. In some examples, network node 615 is structured to provide network node 315 that is shown in FIG. 3. Examples of network node 615 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 615 may be deployed throughout network 300 as a homogenous deployment, heterogeneous deployment, or mixed deployment. A homogeneous deployment may generally describe a deployment made up of the same (or similar) type of network nodes 615 and/or similar coverage and cell sizes and inter-site distances. A heterogeneous deployment may generally describe deployments using a variety of types of network nodes 615 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 615 may include one or more of transceiver 610, processing circuitry 620, memory 630, and network interface 640. In some embodiments, transceiver 610 facilitates transmitting wireless signals to and receiving wireless signals from wireless device 310 (e.g., via antenna 650), processing circuitry 620 executes instructions to provide some or all of the functionality described above as being provided by a network node 615, memory 630 stores the instructions executed by processing circuitry 620, and network interface 640 communicates signals to backend network components, such as a gateway, switch, router, Internet, Public Switched Telephone Network (PSTN), core network nodes or radio network controllers 130, etc.

Processing circuitry 620 may include any suitable combination of hardware and software implemented in one or more modules to execute instructions and manipulate data to perform some or all of the described functions of network node 615, such as those described above in relation to FIGS. 1-5. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by processing circuitry 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for network node 615, send output from network node 615, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of network node 615 may include additional components beyond those shown in FIG. 6 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 7:
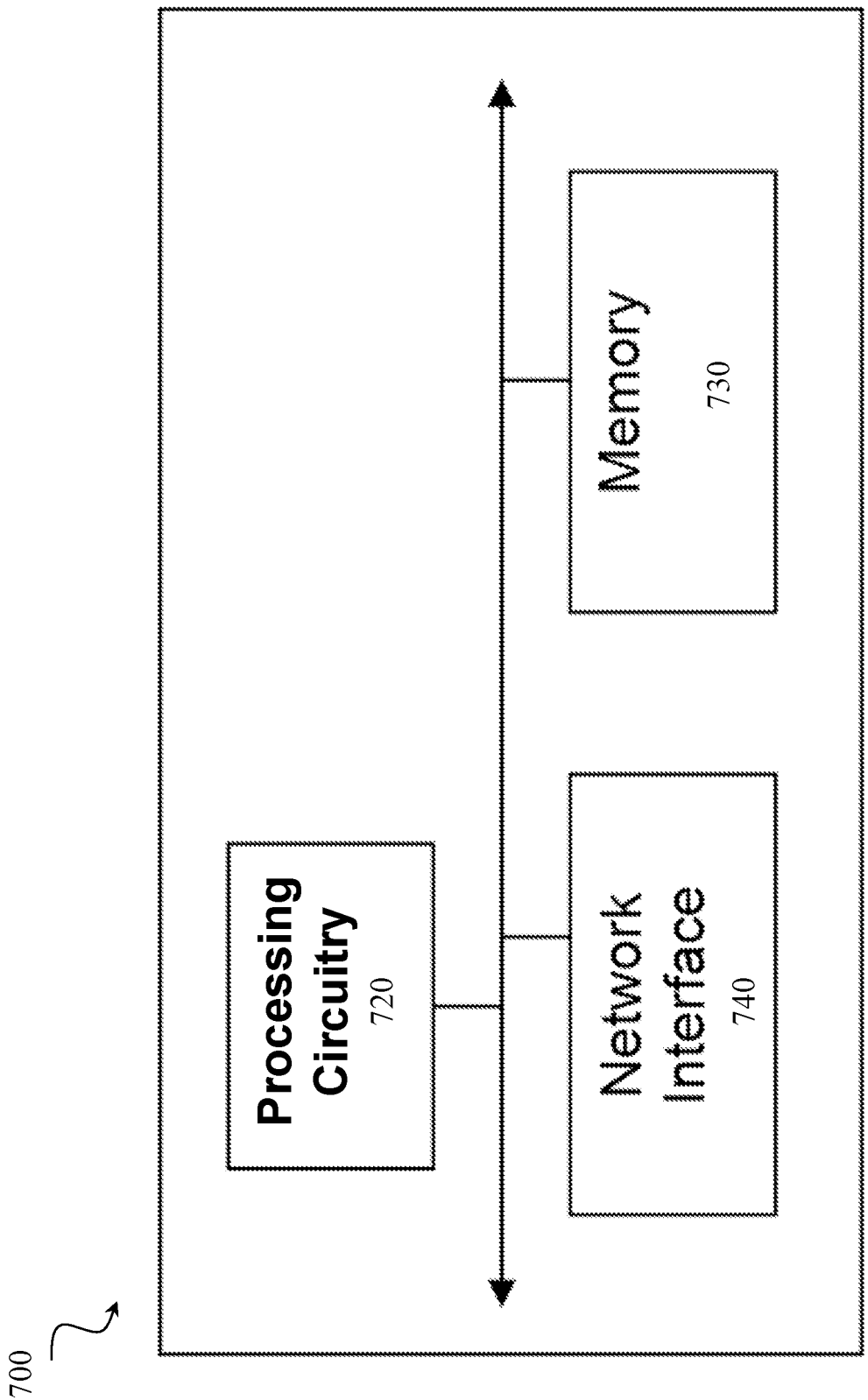
FIG. 7 is a block schematic of an exemplary radio network controller or core network node, according to some examples.

FIG. 7 is a block schematic of an exemplary radio network controller or core network node 700, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 700 includes processing circuitry 720, memory 730, and network interface 740. In some embodiments, processing circuitry 720 executes instructions to provide some or all of the functionality described above as being provided by the network node, memory 730 stores the instructions executed by processing circuitry 720, and network interface 740 communicates signals to any suitable node, such as a gateway, switch, router, Internet, Public Switched Telephone Network (PSTN), network nodes (e.g., network node 315), radio network controllers or core network nodes 700, etc.

Processing circuitry 720 may include any suitable combination of hardware and software implemented in one or more modules to execute instructions and manipulate data to perform some or all of the described functions of the radio network controller or core network node 700. In some embodiments, processing circuitry 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by processing circuitry 720. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for the network node, send output from the network node, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of the network node may include additional components beyond those shown in FIG. 7 that may be responsible for providing certain aspects of the network node's functionality, including any of the functionality described above and/or any additional functionality (including any functionality necessary to support the solution described above).

Figure 8:
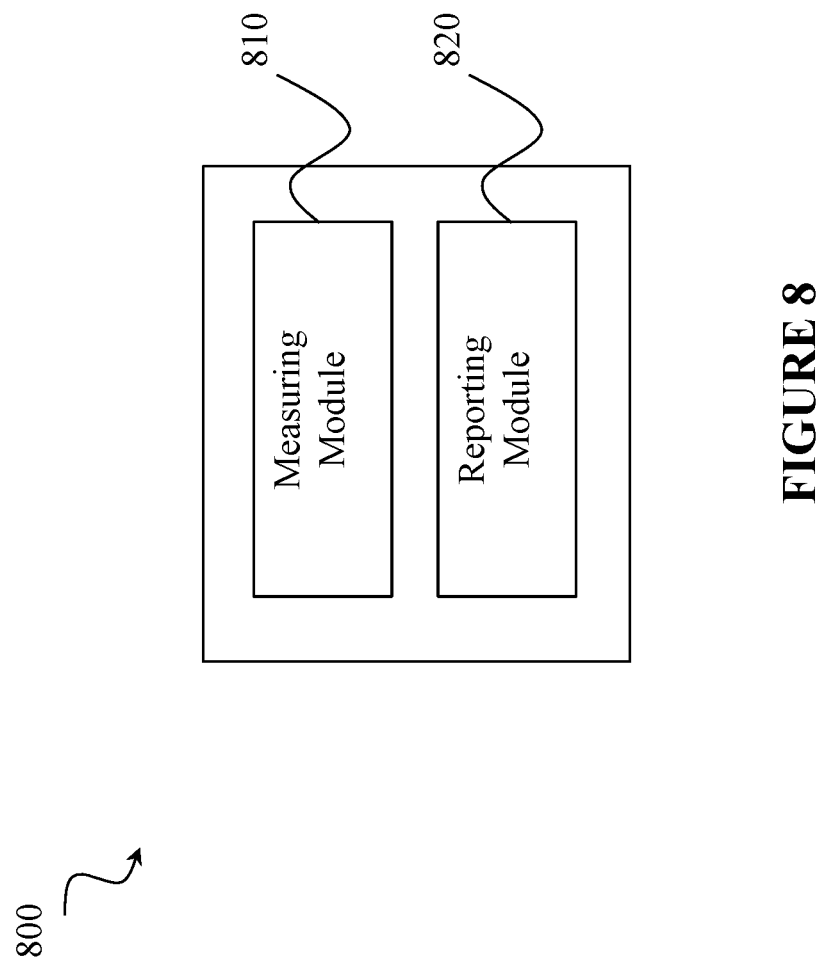
FIG. 8 is a block schematic of an exemplary wireless device, according to some examples.

FIG. 8 is a schematic block diagram of an exemplary wireless device 800, in accordance with certain embodiments. In some examples, the wireless device 800 is structured to provide a UE, such as UE 310 that is described with respect to FIG. 3. Wireless device 800 may include one or more modules. For example, wireless device 800 may include an measuring module 810, a reporting module 820, and any other suitable modules. In some embodiments, one or more of measuring module 810, reporting module 820, or any other suitable module may be implemented using one or more processors, such as processing circuitry 520 described above in relation to FIG. 5. In certain embodiments, the functions of two or more of the various modules may be combined into a single module. Wireless device 800 may perform the methods for cell change described above with respect to FIGS. 1-7.

Measuring module 810 may perform the measuring functions of wireless device 800. As one example, measuring module 810 may perform measurements on a carrier frequency and/or a frequency chunk within the carrier frequency according to a measurement configuration provided by a network node as described with FIGS. 1-2. Measuring module 810 may include or be included in one or more processors, such as processing circuitry 520 described above in relation to FIG. 5. Measuring module 810 may include analog and/or digital circuitry configured to perform any of the functions of obtaining module 810 and/or processing circuitry 520 described above. The functions of measuring module 810 may, in certain embodiments, be performed in one or more distinct modules.

Reporting module 820 may perform the reporting functions of wireless device 800. As one example, reporting module 820 may report measurements on the carrier frequency and/or the frequency chunk within the carrier frequency according to the measurement configuration provided by the network node as described above in relation with FIGS. 1-2. Reporting module 820 may include or be included in one or more processors, such as processing circuitry 520 described above in relation to FIG. 5. Reporting module 820 may include analog and/or digital circuitry configured to perform any of the functions of reporting module 820 and/or processing circuitry 520 described above. The functions of reporting module 820 may, in certain embodiments, be performed in one or more distinct modules.

Measuring module 810 and reporting module 820 may include any suitable configuration of hardware (e.g., processing circuitry 520) and/or software. Wireless device 800 may include additional modules beyond those shown in FIG. 8 that may be responsible for providing any suitable functionality, including any of the functionality described above and/or any additional functionality (including any functionality necessary to support the various solutions described herein).

Figure 9:
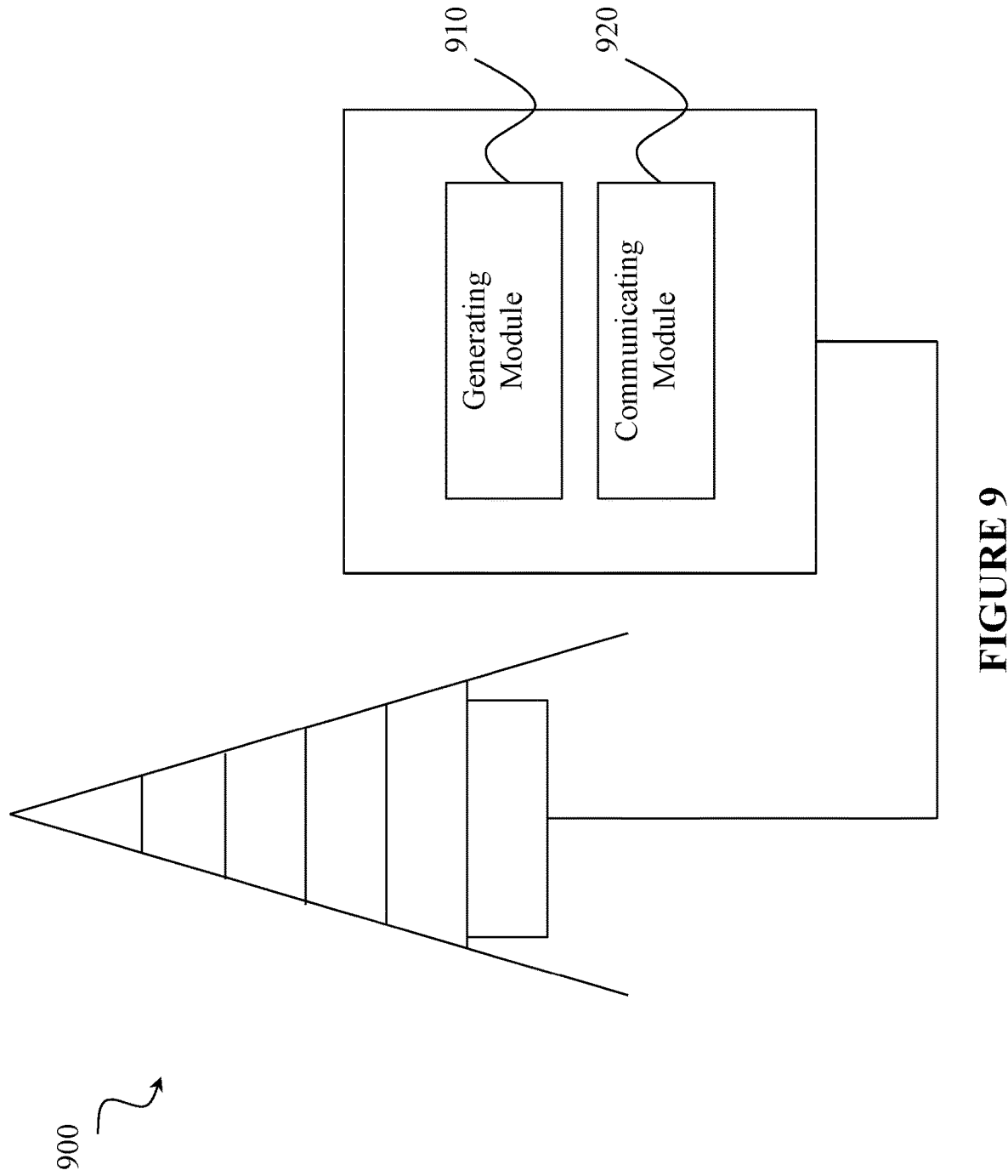
FIG. 9 is a block schematic of an exemplary network node, according to some examples.

FIG. 9 is a schematic block diagram of an exemplary network node 900, in accordance with certain embodiments. In some examples, network node 900 is structured to provide a network node such as network node 315 that is described with respect to FIG. 3. Network node 900 may include one or more modules. For example, network node 900 may include generating module 910, communicating module 920, and any other suitable modules. In some embodiments, one or more of generating module 910, communicating module 920, or any other suitable module may be implemented using one or more processors, such as processing circuitry 620 described above in relation to FIG. 6. In certain embodiments, the functions of two or more of the various modules may be combined into a single module. Network node 900 may perform the methods for cell change described above with respect to FIGS. 1-8.

Generating module 910 may perform the generating functions of network node 900. As an example, generating module 910 may generate a measurement configuration indicating a carrier frequency or a frequency chunk within the carrier frequency as described above with relation to FIGS. 1-2. Generating module 910 may include or be included in one or more processors, such as processing circuitry 620 described above in relation to FIG. 6. Generating module 910 may include analog and/or digital circuitry configured to perform any of the functions of generating module 910 and/or processing circuitry 620 described above. The functions of generating module 910 may, in certain embodiments, be performed in one or more distinct modules.

Communicating module 920 may perform the communicating functions of network node 900. As one example, communicating module 920 may communicate the measurement configuration to a user equipment as described with relation to FIGS. 1-2. Communicating module 920 may include or be included in one or more processors, such as processing circuitry 620 described above in relation to FIG. 6. Communicating module 920 may include analog and/or digital circuitry configured to perform any of the functions of communicating module 920 and/or processing circuitry 620 described above. The functions of communicating module 920 may, in certain embodiments, be performed in one or more distinct modules.

Generating module 910 and communicating module 920 may include any suitable configuration of hardware and/or software. Network node 900 may include additional modules beyond those shown in FIG. 9 that may be responsible for providing any suitable functionality, including any of the functionality described above and/or any additional functionality (including any functionality necessary to support the various solutions described herein).

Figure 13:
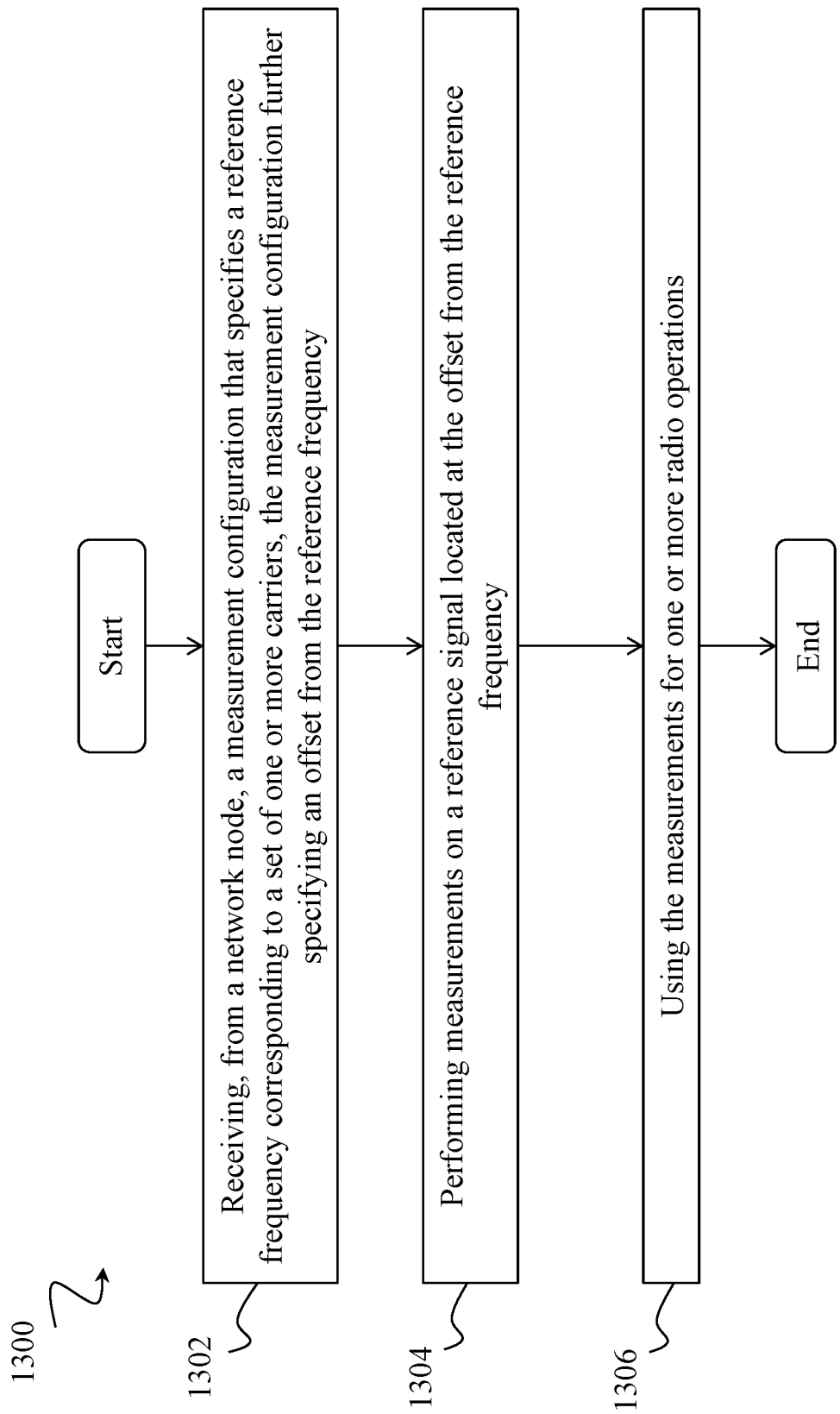
FIG. 13 illustrates an example method of configuring measurements on a user equipment, according to some examples.

FIG. 13 illustrates an example method 1300 of configuring measurements on a user equipment. At step 1302, the user equipment receives, from a network node, a measurement configuration. In some examples, a network node provides a measurement configuration to the user equipment as described below with respect to FIG. 14. In some examples, the user equipment also receives from the network node, a size corresponding to the set of one or more carriers. The measurement configuration specifies a reference frequency corresponding to a set of one or more carriers. The measurement configuration also specifies an offset from the reference frequency.

In some examples, the reference frequency indicates a center frequency of a reference cell, a center frequency of the reference signal, a starting frequency of a frequency band, or an end frequency of a frequency band. In some examples, the specified offset includes a starting index. In some examples, the offset specifies a position of a plurality of frequency resource blocks within the set of one or more carriers, and each of the plurality of frequency resource blocks is associated with a different carrier of the set of one or more carriers. In some examples, the specified reference frequency and the specified offset are specified in a same Radio Resource Control (RRC) Connection Reconfiguration, RRC Connection Resume, or RRC Connection setup communication. In some examples, the user equipment receives the specified reference frequency and the specified offset from the network node via a system information broadcast or responsive to a request from the user equipment.

At step 1304, the user equipment performs measurements on a reference signal located at the offset from the reference frequency. In some examples, the reference signal includes at least one of: a New Radio Synchronization Sequence (NR-SS) that encodes a physical cell identifier; a demodulation reference signal (DMRS); or a Channel State Information Reference Signal (CSI-RS). In some examples, the specified reference frequency and/or the specified offset are included in a bitmap that is received from the network node, where the bitmap indicates a plurality of locations to the user equipment, and the user equipment searches the plurality of locations to locate the reference signal.

At step 1306, the user equipment uses the measurement for one or more radio operations. These radio operations may include one or more of reporting the measurements to the network node, performing time tracking, performing frequency tracking, positioning, or radio link monitoring. In some examples, the user equipment identifies a beam or searches a cell using the reference signal. In some examples, the positioning radio operation is performing a positioning measurement. In some examples, positioning measurements are provided to a network node, such as an eNodeB or a positioning node.

Figure 14:
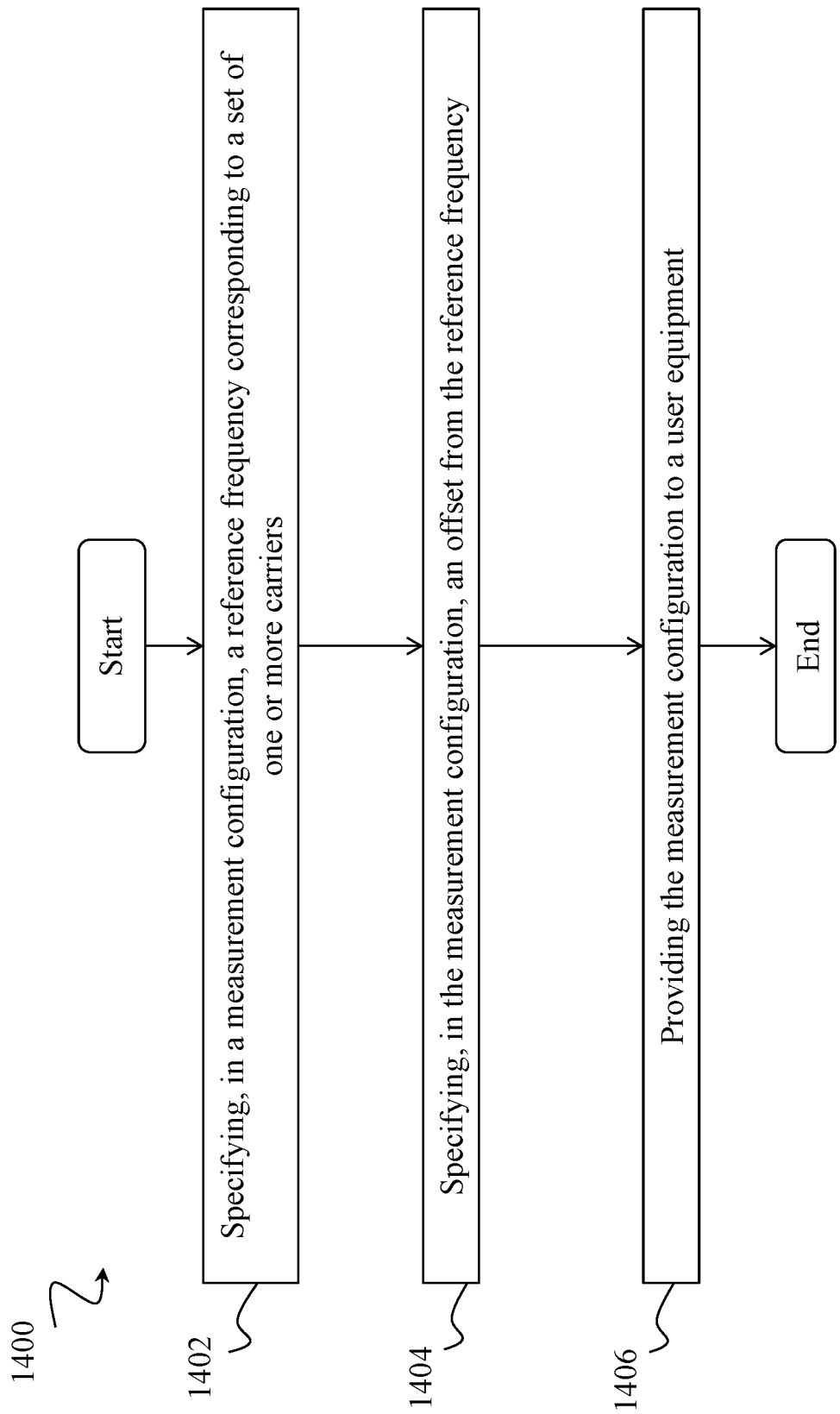
FIG. 14 illustrates an example method of providing a measurement configuration by a network node, according to some examples.

FIG. 14 illustrates an example method 1400 of providing a measurement configuration by a network node. At step 1402, the network node specifies, in a measurement configuration, a reference frequency corresponding to a set of one or more carriers. At step 1404, the network node specifies, in the measurement configuration, an offset from the reference frequency. At step 1406, the network node provides the measurement configuration to a user equipment (UE). In some examples, a user equipment receives the measurement configuration as described above with respect to FIG. 13.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method performed by a user equipment comprising:
receiving, from a network node, a measurement configuration that specifies one or more resources for measuring a Channel State Information Reference Signal, CSI-RS, the measurement configuration comprising a reference frequency channel number associated with a reference frequency, an offset value specifying a number of resource blocks to offset from the reference frequency, and a frequency range specifying the number of resource blocks to measure;
performing measurements on a range of frequencies, the range of frequencies comprises the frequency range of frequencies starting at the reference frequency offset by the offset value; and
using the measurements for one or more radio operations.

2. The method according to claim 1, wherein the radio operations comprise one or more of: reporting the measurements to the network node; performing time tracking; performing frequency tracking; or radio link monitoring.

3. The method according to claim 1, further comprising receiving, from the network node, a size corresponding to the set of one or more carriers.

4. The method according to claim 1, further comprising identifying a beam based on the reference signal.

5. The method according to claim 1, further comprising searching a cell based on the reference signal.

6. The method according to claim 1, wherein each of the plurality of resource blocks is associated with a different carrier of a set of one or more carriers.

7. The method according to claim 1, wherein the reference frequency channel number, the offset value, and the frequency range are specified in a same Radio Resource Control, RRC, Connection Reconfiguration, RRC Connection Resume, or RRC Connection setup communication.

8. A method performed by a network node in a radio access network, RAN, the method comprising:
determining a measurement configuration for a user equipment (UE), the measurement configuration specifies one or more resources for measuring a Channel State Information Reference Signal, CSI-RS, the measurement configuration comprising a reference frequency channel number associated with a reference frequency, an offset value specifying a number of resource blocks to offset from the reference frequency, and a frequency range specifying the number of resource blocks to measure; and
providing the UE with the measurement configuration.

9. The method according to claim 8 further comprising transmitting one or more reference signals, wherein at least one of the transmitted reference signals is transmitted within the frequency range starting from the reference frequency offset by offset value.

10. The method according to claim 8 further comprising receiving a measurement report message from the UE comprising the results of the UE measurements.

11. The method according to claim 8, wherein each of the plurality of resource blocks is associated with a different carrier of a set of one or more carriers.

12. The method according to claim 8, wherein providing the measurement configuration comprises providing the reference frequency channel number, the offset value, and the frequency range in a same Radio Resource Control, RRC, Connection Reconfiguration, RRC Connection Resume, or RRC Connection setup communication.

13. A user equipment (UE) comprising:
a wireless interface configured to receive, from a network node, a measurement configuration that specifies one or more resources for measuring a Channel State Information Reference Signal, CSI-RS, the measurement configuration comprising a reference frequency channel number associated with a reference frequency, an offset value specifying a number of resource blocks to offset from the reference frequency, and a frequency range specifying the number of resource blocks to measure; and
processing circuitry configured to:
perform measurements on a range of frequencies, the range of frequencies comprises the frequency range of frequencies starting at the reference frequency offset by the offset value; and
use the measurements for one or more radio operations.

14. The UE according to claim 13, wherein the radio operations comprise one or more of: reporting the measurements to the network node; performing time tracking; performing frequency tracking; or radio link monitoring.

15. The UE according to claim 13, wherein the wireless interface is further configured to receive, from the network node, a size corresponding to the set of one or more carriers.

16. The UE according to claim 13, wherein the processing circuitry is further configured to identify a beam based on the reference signal.

17. The UE according to claim 13, wherein the wireless interface is further configured to search a cell based on the reference signal.

18. The UE according to claim 13, wherein each of the plurality of resource blocks is associated with a different carrier of a set of one or more carriers.

19. The UE according to claim 13, wherein the reference frequency channel number, the offset value, and the frequency range are specified in a same Radio Resource Control, RRC, Connection Reconfiguration, RRC Connection Resume, or RRC Connection setup communication.

20. A network node in a radio access network, RAN, the network node comprising:
  processing circuitry configured to determine a measurement configuration for a user equipment (UE), the measurement configuration specifies one or more resources for measuring a Channel State Information Reference Signal, CSI-RS, the measurement configuration comprising a reference frequency channel number associated with a reference frequency, an offset value specifying a number of resource blocks to offset from the reference frequency, and a frequency range specifying the number of resource blocks to measure; and
  a wireless interface configured to provide the UE with the measurement configuration.

21. The network node according to claim 20 wherein the wireless interface is further configured to transmit one or more reference signals, wherein at least one of the transmitted reference signals is transmitted within the frequency range starting from the reference frequency offset by offset value.

22. The network node according to claim 20 wherein the wireless interface is further configured to receive a measurement report message from the UE comprising the results of the UE measurements.

23. The network node according to claim 20, wherein each of the plurality of resource blocks is associated with a different carrier of a set of one or more carriers.

24. The network node according to claim 20, wherein the wireless interface configured to provide the measurement configuration is further configured to provide the reference frequency channel number, the offset value, and the frequency range in a same Radio Resource Control, RRC, Connection Reconfiguration, RRC Connection Resume, or RRC Connection setup communication.

* * * * *